(12) United States Patent
Anvari

(10) Patent No.: US 7,649,927 B1
(45) Date of Patent: Jan. 19, 2010

(54) EQUALIZER FILTER WITH DYNAMICALLY CONFIGURABLE CONVOLUTION FILTER

(75) Inventor: Kiomars Anvari, 1567 Serafix Rd., Alamo, CA (US) 94507

(73) Assignee: Kiomars Anvari, Alamo, CA (US)

( * ) Notice: Subject to any disclaimer, the term of this patent is extended or adjusted under 35 U.S.C. 154(b) by 623 days.

(21) Appl. No.: 11/646,876

(22) Filed: Dec. 29, 2006

(51) Int. Cl.
*H04B 1/00* (2006.01)

(52) U.S. Cl. ............ 375/150; 375/143; 375/229; 375/232; 375/345; 375/230; 455/114.3; 455/114.2; 455/127.2; 370/206

(58) Field of Classification Search ........ 455/114.3, 455/114.2, 127.2; 370/206
See application file for complete search history.

(56) References Cited

U.S. PATENT DOCUMENTS

| | | | |
|---|---|---|---|
| 7,142,831 B2* | 11/2006 | Anvari | 455/114.2 |
| 7,146,138 B2* | 12/2006 | Anvari | 455/114.3 |
| 7,391,713 B2* | 6/2008 | Anvari | 370/206 |
| 2004/0203540 A1* | 10/2004 | Anvari et al. | 455/114.3 |
| 2005/0085198 A1* | 4/2005 | Anvari | 455/114.3 |
| 2005/0118966 A1* | 6/2005 | Anvari | 455/127.2 |
| 2005/0136859 A1* | 6/2005 | Anvari | 455/114.3 |
| 2005/0141408 A1* | 6/2005 | Anvari | 370/206 |

* cited by examiner

*Primary Examiner*—Sudhanshu C Pathak

(57) ABSTRACT

A technique for an equalizer filter with dynamically configurable convolution filter is described. The input to a transmitter chain is modified by an equalizer filter, prior to being applied to the transmitter. The equalizer filter modifies and smoothen the amplitude of the signal. The modified and smoothen signal has its peaks reduced which results in lower Crest Factor. The input to the reconditioning equalizer filter could be a baseband, an intermediate frequency (IF) or radio frequency (RF) signal. In the case of an IF or RF signal, it needs to be down converted to baseband before applied to the equalizer filter.

6 Claims, 4 Drawing Sheets

EQUALIZER FILTER WITH DYNAMICALLY CONFIGURABLE CONVOLUTION FILTER

BACKGROUND OF INVENTION

The present invention relates to an equalizer filter to boost the performance of any Orthogonal Frequency Division Multiplexing (OFDM) and Orthogonal Frequency Division Multiple Access (OFDMA) communication transmitter. The equalizer filter input could be baseband, intermediate frequency (IF), or RF signal and its output is the peak reduced and smoothen baseband signal that can be up converted to IF or RF. In any OFDM and OFDMA communication system one of the critical sub-systems is the transmitter. This sub-system has a major contribution in cost, power consumption, and size of the system. The main reason is the requirement of communication transmitter sub-system for linear components. The higher the linearity, the higher the power consumption, cost and size. In order to minimize the cost, size and power consumption there is a need for techniques that overcome this problem. This invention conquers these challenges by using a simple and accurate reconditioning equalizer filter module used at the input to this sub-system.

SUMMARY OF INVENTION

According to the invention, an equalizer filter, for use with OFDM and OFDMA communication transmitter sub-system, uses a plurality of simple and accurate algorithm in conjunction with intelligent signal processing to improve signal handling of any wireless, optical, or wireline communication transmitter. By intelligent, it is meant that the algorithm has features of maintaining the signal emission and quality requirements while applying the reconditioning equalizer filter. The equalizer filter uses the transmitter sub-system input which could be a baseband, an IF or RF signal as its input and conditions and smoothens the signal before applying it back to the transmitter sub-system. The conditioning and smoothening helps to boost the power handling of the transmitter subsystem or acts more linearly. The inputs to the equalizer filter should be within a limit that can be handled by the equalizer filter.

In a particular embodiment, the equalizer filter algorithm comprises a signal processing module. The signal processor performs the signal conditioning and smoothening.

The invention will be better understood by reference to the following detailed description in conjunction with the accompanying drawings.

DESCRIPTION OF THE SPECIFIC EMBODIMENTS

In a first preferred embodiment of the invention, an equalizer filter uses sub-harmonic sampling to convert RF or IF signals to digital baseband signal. In a second preferred embodiment the main baseband signal is amplitude conditioned and smoothened using an equalizer filter with dynamically configurable convolution filter. In a third embodiment an equalizer filter injects in band and out of band signal into the main baseband signal through a feedforward loop. In a fourth embodiment the injected in band and out of band signal into the main baseband signal is adjusted by a dynamically configurable convolution filter in a feedforward loop. In a fifth embodiment the injected in band and out of band signal into the main baseband signal is gain adjusted in a feedforward loop. In a sixth embodiment a convolution filter in a feedforward loop uses Discrete Fourier Transform and Inverse Discrete Fourier Transform DFT/IDFT. In a seventh embodiment a convolution filter uses a dynamically configurable mask to dynamically configure a second convolving signal. In an eighth embodiment a dynamically configurable mask gets its input from an OFDM or OFDMA modem to dynamically configure a second convolving signal. In a ninth embodiment a second convolving signals which is dynamically configured by a mask is a frequency domain baseband signal. In a tenth embodiment the result of the output of a detector is used to dynamically configure a mask. In an eleventh embodiment a detector uses the output of an OFDM or OFDMA modem as its input. In a twelfth embodiment the out put of an equalizer filter with dynamically configurable convolution filter is used as the new input to the transmit sub-system.

Figure 1:
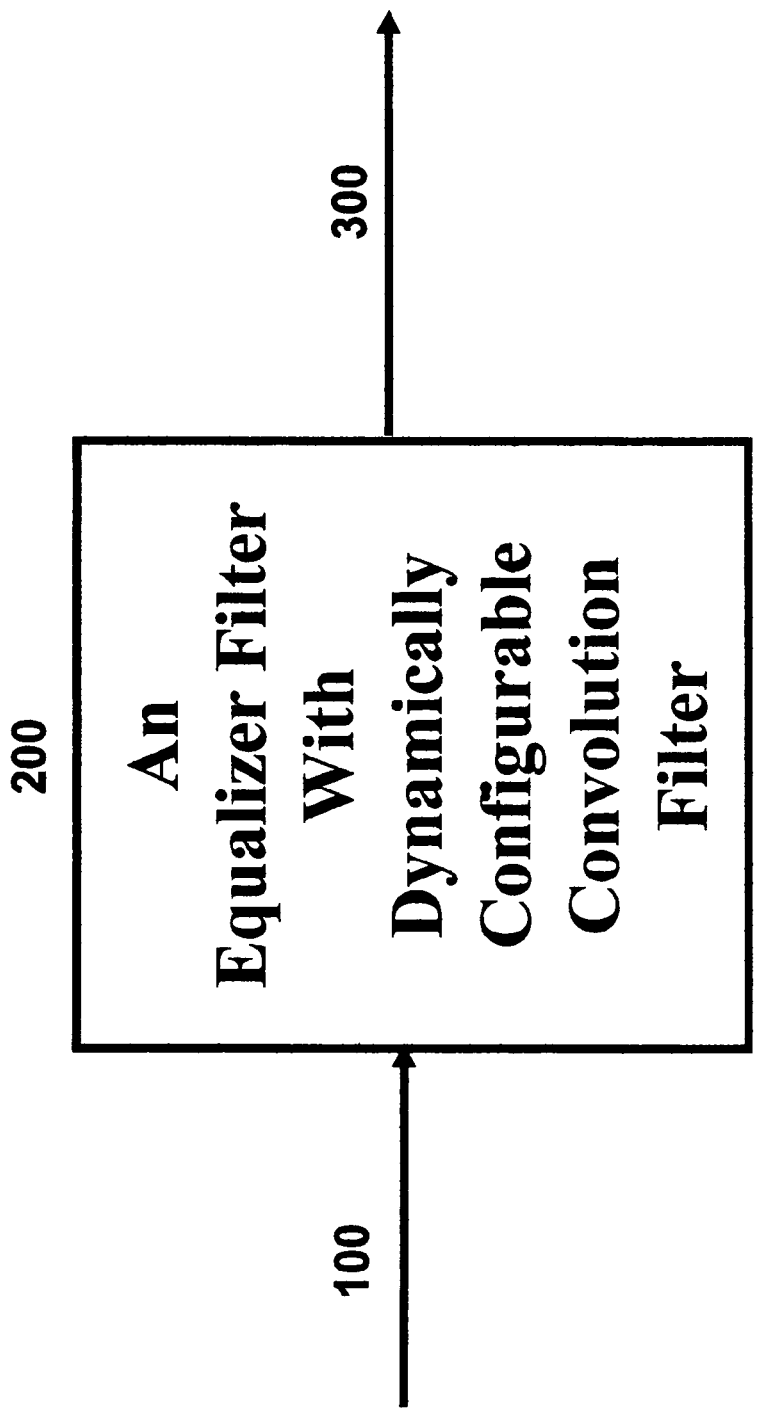
FIG. 1 is an overall block diagram of the equalizer filter with dynamically configurable convolution filter

Referring to FIG. 1, block diagram of an equalizer filter for OFDM or OFDMA signal is illustrated. The equalizer filter 200 receives its baseband input 100 and produce conditioned and smoothened output baseband signal 300. The conditioning equalizer filter performs the following functions:

1. Conditions and smoothens the input baseband signal 100 before applying to transmitter sub-system.
2. Adjust the gain in the signal paths to keep the total gain from input to output of the equalizer filter unity.

Figure 2:
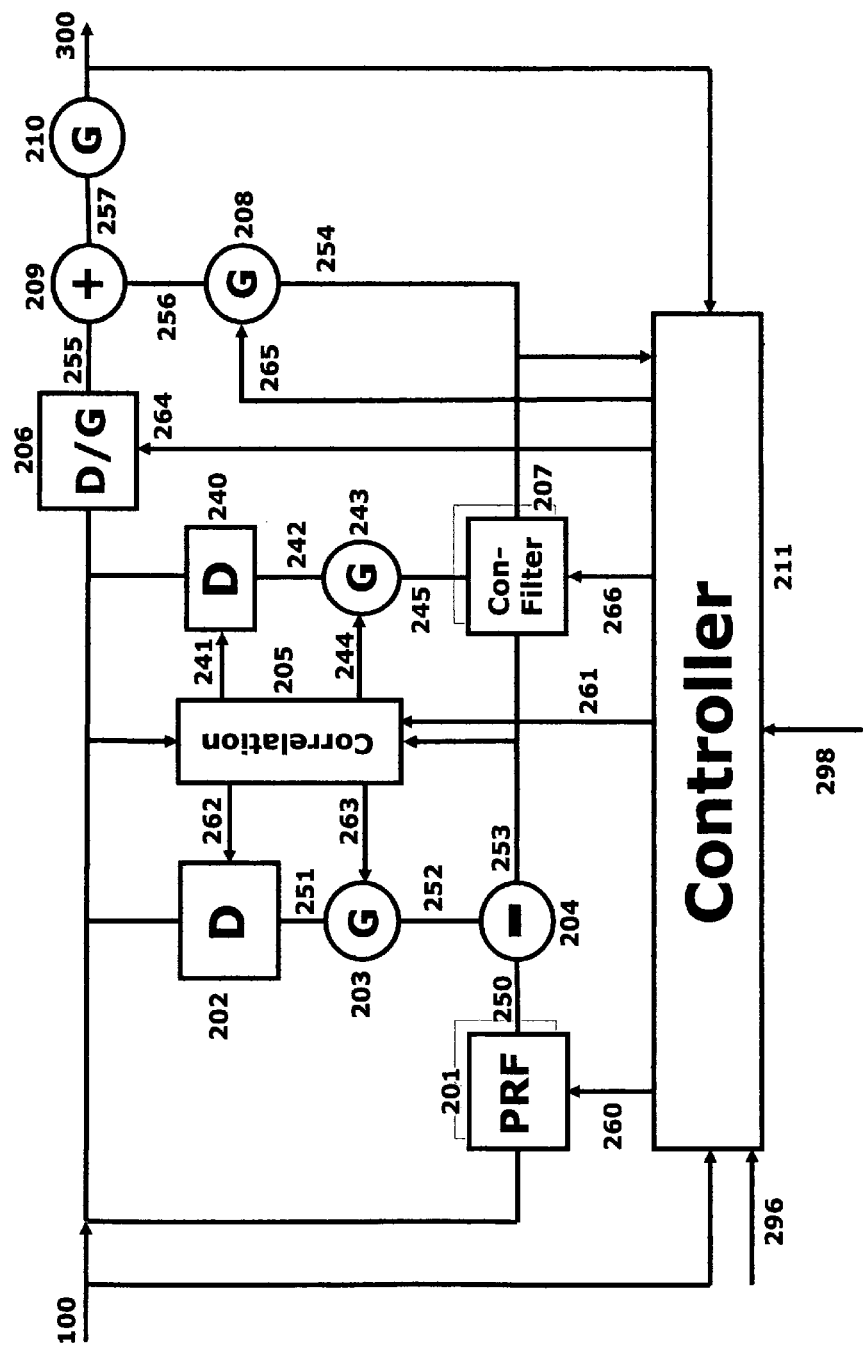
FIG. 2 is the detail block diagram of the equalizer filter with dynamically configurable convolution filter in a feedforward loop

FIG. 2 illustrates the detail block diagram of the equalizer filter for OFDM and OFDMA signals with dynamically configurable convolution filter. The received main baseband signal 100 is applied to Peak Reduction Filter (PRF) 201 to produce peak reduced main baseband signal 250. The PRF 201 receives control signal 260 from controller 211 to adjust the amount of peak reduction. The main baseband signal 100 is delayed in delay function 202 to produce delayed main baseband signal 251. The delayed main baseband signal 251 is gain adjusted in gain function 203 to produce delay and gain adjusted main baseband signal 252. The delay and gain adjusted main baseband signal 252 is subtracted from peak reduced baseband signal 250 in subtraction function 204 to produce baseband signal 253. The amount of delay 262 and gain adjustment 263 are calculated by the correlation function 205 that uses main baseband signal 100 and signal 253 as its inputs. The correlation block 205 also receives a control signal 261 from controller block 211 to calculate the delay adjustment value 262 and gain adjustment value 263. The baseband signal 253, subtraction of peak reduced main baseband signal and delay and gain adjusted main baseband signal, is applied to convolution filter 207 to adjust the out of band and unwanted signal and produce in-band baseband signal 254. The inputs into convolving filter 207 is a pre-configured frequency domain signal from controller 211 and subtraction of peak reduced main baseband signal and delay and gain adjusted main baseband signal. The pre-configured frequency domain signals 266 from controller 211 used by convolution filter 207 can be set during configuration or dynamically during operation. The in-band baseband signal 254 is gain adjusted by gain block 208 to produce gain adjusted in-band baseband signal 256. The amount of gain adjustment 265 is supplied by controller function 211. The main baseband signal 100 is delay and gain adjusted by delay/gain block 206 to produce delay and gain adjusted main baseband signal 255. The delay and gain adjusted main baseband signal 255 and the gain adjusted in-band basband signal 256 are summed in summation function 209 to produce modified main baseband signal 257. The modified main baseband signal 257 is gain adjusted by gain function 210 to produce conditioned and smoothen baseband signal 300. The main baseband signal 100 and the conditioned and smoothen baseband signal 300 are applied to controller 211 to provide the gain and delay parameters needed for the gain and delay functions, peak reduction filter and the correlation function. The controller 211 also gets modem information and external signals to create the second convolving signal for convolution filter 207.

Figure 3:
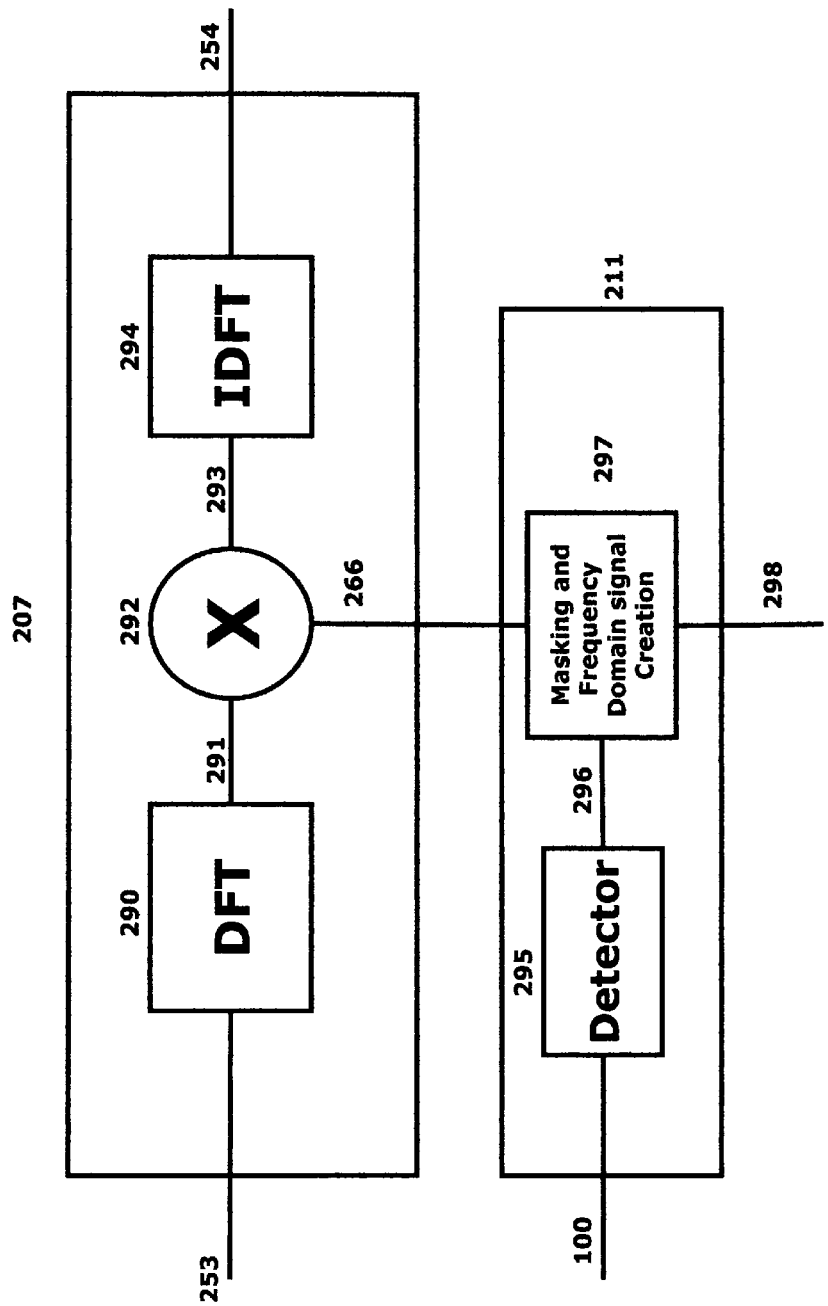
FIG. 3 is the detail block diagram of convolution filter using a detector to provide masking information

FIG. 3 illustrates the detail block diagram of the convolution filter function 207 when a detector is used to provide the information for dynamically masking one of the convolving signals. The baseband signal 253 which is the result of subtraction of delay and gain adjusted main baseband signal and peak reduced main baseband signal is applied to Discrete Fourier Transform (DFT) function 290 to produce the frequency domain signal 291. The frequency domain baseband signal 291 is multiplied with the dynamically configured frequency domain baseband signal 266 in multiplier 292 to produce a new frequency domain baseband signal 293. The new frequency domain baseband signal 293 is transformed to time domain by Inverse Discrete Fourier Transform (IDFT) block 294 to produce the time domain baseband signal 254. The main baseband signal 100 which is an OFDM or OFDMA signal is applied to a detector function 295 to detect the active sub-carriers, the modulation of active sub-carriers, the signal timing, and the level of the active sub-carriers within the OFDM or OFDMA signal. This information 296 from detector 295 are used to dynamically modify the parameters and values of masking function 297 in order to create a frequency domain convolving signal 266 for multiplier 292 within convolution filter 207.

Figure 4:
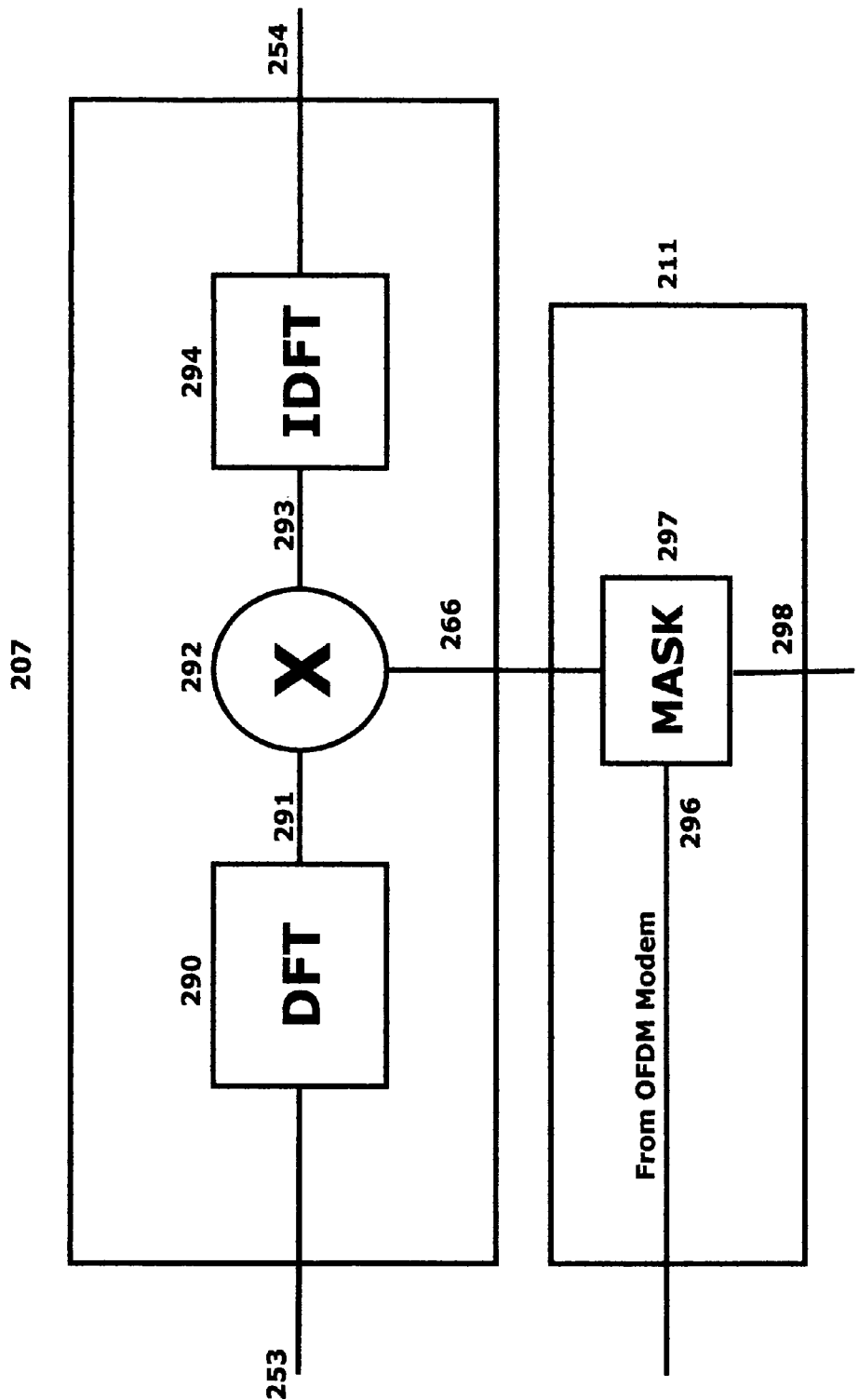
FIG. 4 is the detail block diagram of convolution filter using OFDM or OFDMA modem to provide masking information

FIG. 4 illustrates the detail block diagram of the convolution filter function 207 using the OFDM or OFDMA modem's information for dynamically masking one of the convolving signals. The baseband signal 253 which is the result of subtraction of delay and gain adjusted main baseband signal and peak reduced main baseband signal is applied to Discrete Fourier Transform (DFT) function 290 to produce the frequency domain signal 291. The frequency domain baseband signal 291 is multiplied with the dynamically configured frequency domain baseband signal 266 in multiplier 292 to produce a new frequency domain baseband signal 293. The new frequency domain baseband signal 293 is transformed to time domain by Inverse Discrete Fourier Transform (IDFT) block 294 to produce the new time domain baseband signal 254. The active sub-carriers, modulation of active sub-carriers, signal timing, and the level of each active sub-carriers within the OFDM or OFDMA signal is provided by OFDM or OFDMA modem. This information 296 from OFDM or OFDMA modem are used to dynamically modify the parameters and values of masking function 297 in order to create the a frequency domain convolving signal 266 for multiplier 292 within convolution filter 207.

What is claimed is:

1. An equalizer filter with dynamically configurable code domain filter, to condition and smoothen a main baseband signal to improve the performance of a transmit path, for use with Code Domain Multiple Access (CDMA) signals to enhance the performance of any communication transmitter, in any wireless cellular, Personal Communication System (PCS), wireless Local Area Network and Wireless Wide Area Network (LAN/WAN), Video and Audio Wireless Broadcasting, line of sight point-to-point microwave, military, satellite communication systems and any other wireless applications, the equalizer filter with dynamically configurable convolution filter comprising:

a peak reduction filter to produce a peak reduced main baseband signal;

a feedforward loop that injects a controlled in band and out of band baseband signal into the main baseband signal to produce an injected baseband signal;

a first gain element that adjusts the gain of the main baseband signal;

a second gain element that adjusts the gain of sum of a delay and gain adjusted main baseband signal and the injected baseband signal;

a controller that uses the main baseband signal, the output of the equalizer filter with dynamically configurable convolution filter, and external information to provide control signal to various delay and gain functions as well as peak reduction filter, the correlation function and a convolution filter;

wherein the convolution filter comprising:

a DFT or FFT function element that converts the time domain subtraction of the delay and gain adjusted main baseband signal and the peak reduced main baseband signal to frequency domain and produces a frequency domain of the subtraction of the delay and gain adjusted main baseband signal and the peak reduced main baseband signal;

a multiplier that multiplies a pre-configured frequency domain baseband signal and the frequency domain (DFT or FFT) of the subtraction of the delay and gain adjusted main baseband signal and the peak reduced main baseband signal;

an IDFT or IFFT function element that converts the output of a multiplier that multiplies a pre-configured frequency domain baseband signal and the frequency domain or output of the DFT (or FFT) of the subtraction of the delay and gain adjusted main baseband signal and the peak reduced main baseband signal to time domain;

a detector that uses the main baseband signal to detect the timing of the OFDM or OFDMA signal, OFDM or OFDMA active sub-carriers, type of modulation of the OFDM or OFDMA active sub-carders and the level or magnitude of the OFDM or OFDMA active sub-carriers;

a masking element that uses the information detected by the detector function, OFDM or OFDMA timing, OFDM or OFDMA active sub-carriers, type of the modulation of the OFDM or OFDMA active sub-carriers and the magnitude of the OFDM or OFDMA active sub-carriers to generate the frequency domain of the second baseband convolving signal for the multiplier of the convolution filter.

2. The equalizer filter with dynamically configurable convolution filter according to claim 1, wherein the in band and out of band baseband signal is adjusted by a dynamically configurable convolution filter in a feedforward loop that injects controlled in band and out of band baseband signal into main baseband signal, wherein the feedforward loop comprising:

a delay element that adjusts the delay of the main baseband signal to produce a delayed main baseband signal;

a second gain element that adjusts the gain of the delayed main baseband signal to produce a gain adjusted delayed main baseband signal;

a subtracting element that subtracts the gain adjusted delayed main baseband signal and the peak reduced main baseband signal;

a correlator that correlates the main baseband signal and the result of the subtraction of the gain adjusted delayed main baseband signal and the peak reduced main baseband signal to calculate the amount of the delay adjustment for the main baseband signal in a feedforward loop and the gain adjustment for the delayed main baseband signal;

a digital baseband convolution filter that, uses a pre-configured frequency domain baseband signal, and filters the result of the subtraction of the gain adjusted delayed main baseband signal and the peak reduced main baseband signal in a feedforward loop before injection into the main baseband signal to produce a convolution filtered signal;

a third gain element that adjusts the code domain filtered signal to produce the injected baseband signal;

a delay/gain adjustment element that delays and gain adjusts the main baseband signal;

a summing element that adds the delay and gain adjusted main baseband signal and the injected baseband signal.

3. The equalizer filter with dynamically configurable convolution filter according to claim 1, wherein the dynamically configurable digital baseband convolution filter uses a masking function to produce a dynamically pre-configured frequency domain baseband signal as a second baseband convolving signal, the masking function performing the following functions:

creates a second frequency domain baseband convolving signal using the information supplied by a main baseband OFDM or OFDMA modulator;

creates a second frequency domain baseband convolving signal using the information supplied by a detector or demodulator using main baseband OFDM or OFDMA signal as its input;

uses the main baseband OFDM or OFDMA signal timings information, main baseband OFDM or OFDMA signal active sub-carriers information, main baseband OFDM or OFDMA signal modulation used by active sub-carriers information, main baseband OFDM or OFDMA signal active sub-carrier's magnitude information, main baseband OFDM or OFDMA signal active pilot sub-carriers information, main baseband OFDM or OFDMA signal active synchronization sub-carriers information, main baseband OFDM or OFDMA signal active control channel sub-carriers information, main baseband OFDM or OFDMA signal active peak reduction sub-carriers information, main baseband OFDM or OFDMA signal active training and preamble sub-carriers information, main baseband OFDM or OFDMA signal guard band sub-carriers information, and the main baseband OFDM or OFDMA signal idle sub-carriers information provided by the OFDM or OFDMA modulator to create a dynamically configurable frequency domain second baseband signal for a dynamically configurable convolution filter;

uses the main baseband OFDM or OFDMA signal timings information, main baseband OFDM or OFDMA signal active sub-carriers information, main baseband OFDM or OFDMA signal modulation used by active sub-carriers information, main baseband OFDM or OFDMA signal active sub-carrier magnitude information, main baseband OFDM or OFDMA signal active pilot sub-carriers information, main baseband OFDM or OFDMA signal active synchronization sub-carriers information, main baseband OFDM or OFDMA signal active control channel sub-carriers information, main baseband OFDM or OFDMA signal active peak reduction sub-carriers information, main baseband OFDM or OFDMA signal active training and preamble sub-carriers information, main baseband OFDM or OFDMA signal guard band sub-carriers information, and the main baseband OFDM or OFDMA signal idle sub-carriers information provided by a OFDM or OFDMA detector or demodulator that uses the main baseband OFDM or OFDMA signal as its input to create a dynamically configurable frequency domain baseband signal for a dynamically configurable convolution filter;

create a baseband frequency domain signal having sub-carriers with different weighting defined by the information supplied by the baseband OFDM or OFDMA modulator output;

create a baseband frequency domain signal having sub-carriers with different weighting defined by the information supplied by the baseband OFDM or OFDMA detector or demodulator output;

create a baseband frequency domain signal having sub-carriers with weighting based on the modulation of the active sub-carriers defined by the information supplied by the baseband OFDM or OFDMA modulator output;

create a baseband frequency domain signal having sub-carriers with weighting based on the modulation of the active sub-carriers defined by the information supplied by the baseband OFDM or OFDMA detector or demodulator output;

create a baseband frequency domain signal having sub-carriers with different weighting based on the magnitude of the active sub-carriers defined by the information supplied by the baseband OFDM or OFDMA modulator output;

create a baseband frequency domain signal having sub-carriers with different weighting based on the magnitude of the active sub-carriers defined by the information supplied by the baseband OFDM or OFDMA detector or demodulator output;

create a baseband frequency domain signal having sub-carriers with different weighting based on the type of the active sub-carriers defined by the information supplied by the baseband OFDM or OFDMA modulator output;

create a baseband frequency domain signal having sub-carriers with different weighting based on the type of the active sub-carriers defined by the information supplied by the baseband OFDM or OFDMA detector or demodulator output;

create a baseband frequency domain signal having sub-carriers with different weighting based on the combination of modulation, magnitude and type of the active sub-carriers defined by the information supplied by the baseband OFDM or OFDMA modulator output;

create a baseband frequency domain signal having sub-carriers with different weighting based on the combination of modulation, magnitude and type of the active sub-carriers defined by the information supplied by the baseband OFDM or OFDMA detector or demodulator output.

4. The equalizer filter with dynamically configurable convolution filter according to claim 1, wherein a controller using the input and the output of the equalizer filter controls the delay and gain adjustment functions used in equalizer filter, and provides the preconfigured frequency domain baseband signal to be used for the second input of the multiplier used in the convolution filter.

5. The equalizer filter with dynamically configurable convolution according to any one of claims 1 to 4, when it is used in any wireless and wireline communication transmitter, in wireless cellular, wireless PCS, wireless LAN, Wireless WAN, Wireless Broadband, microwave, wireless satellite, WiMax, wireless audio and video broadcasting, any wireline broadband cable and Digital Subscriber Line (DSL) transmitter, optical transmitters, and any wireless communication systems used for military applications.

6. The equalizer filter with dynamically configurable convolution according to any one of claims 1 to 4, wherein the Digital Signal Processing (DSP) function can be implemented in programmable logic, Field Programmable Gate Array (FPGA), Gate Array, Application Specific Integrated Circuit (ASIC), and DSP processor.

* * * * *